Nov. 4, 1969
L. I. GRIFFIN, JR
3,476,608
FUEL CELL AND METHOD FOR PRODUCING PULSATING
DIRECT ELECTRICAL CURRENT
Filed June 21, 1965
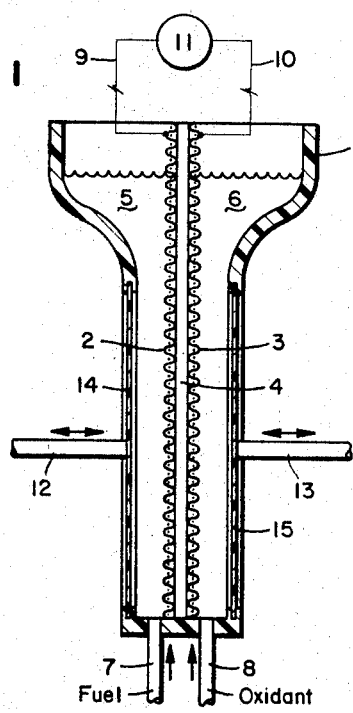
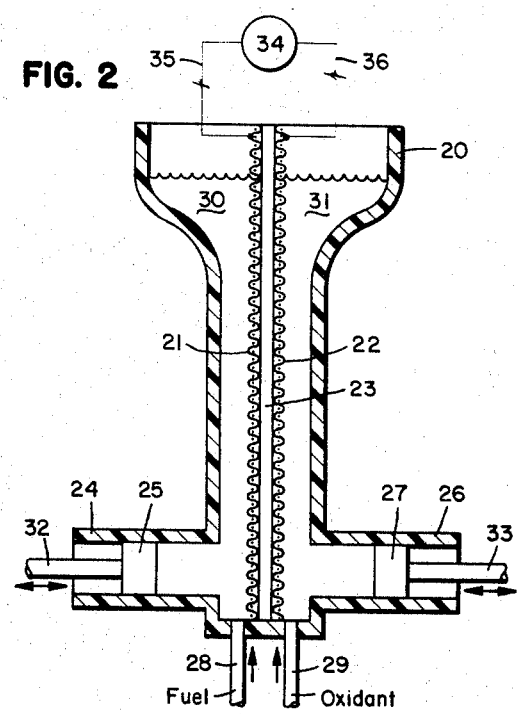
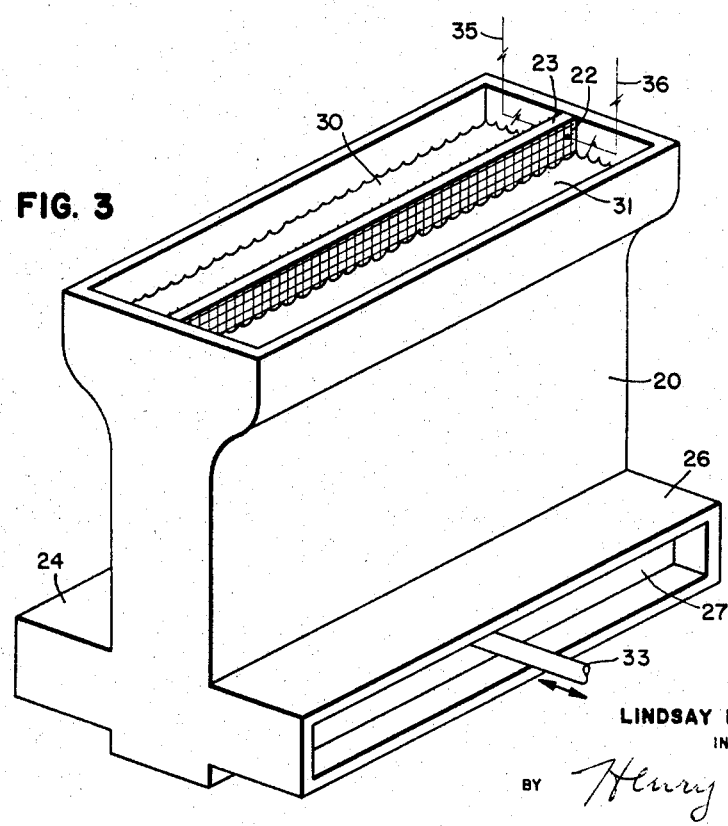
LINDSAY I. GRIFFIN, JR.
INVENTOR
BY Henry Beck

United States Patent Office 3,476,608
Patented Nov. 4, 1969

3,476,608
FUEL CELL AND METHOD FOR PRODUCING PULSATING DIRECT ELECTRICAL CURRENT
Lindsay I. Griffin, Jr., Summit, N.J., assignor to Esso Research and Engineering Company, a corporation of Delaware
Filed June 21, 1965, Ser. No. 465,296
Int. Cl. H01m 27/04
U.S. Cl. 136—86
8 Claims

ABSTRACT OF THE DISCLOSURE

A fuel cell containing a slurry of electrolyte and particulate catalyst may be operated to produce a current which may be easily transformed from low to high frequency by pulsating the electrolyte slurry by means of a device operating in simple harmonic motion.

---

This invention relates to the production of pulsating electrical current. In particular, the invention relates to a device for converting chemical energy to pulsating electrical energy and to the process for effecting such conversions. More particularly, this invention relates to a novel fuel cell wherein fuel and oxygen compartments containing an electrolyte slurry or a catalyst comprising particulate solids are separated each from the other, and the cell is operated such that the number of contacts of the particulate solids with the anode and cathode varies with respect to time.

Since the electrolyte in the fuel compartment will be in contact with the anode and the electrolyte in the oxygen compartment will be in contact with the cathode, the fuel and oxygen compartments may also be referred to as the anolyte and catholyte compartments, respectively. The terms "anode" and "fuel electrode" are used interchangeably as are the terms "cathode" and "oxygen electrode."

An object of the present invention is to provide a fuel cell containing an electrolyte slurry of conductive catalyst-bearing particulate solids in the fuel and/or oxidant compartments to be operated so that the number of contacts of the particulate solids in the electrolyte with the electrode varies with time.

It is another object of this invention to provide a cell for carrying out the process of effecting pulsating current from a fuel cell.

It is still another object of the present invention to provide a source of high voltage by operating a cell in accordance with this invention and passing the current produced through a transformer.

These, and other objects of this invention, will be more apparent from the detailed description of the invention as hereinafter set forth.

The term "fuel cell" is used in the art to denote a device for directly converting chemical energy released by the oxidation of a combustible fuel to electrical energy. The term "combustible fuel" as used includes hydrogen, hydrogen yielding nonmetallic inorganic compounds such as ammonia, carbonaceous fuels such as carbon monoxide and organic compounds. The more adaptable organic compounds include hydrocarbons and oxygen-substituted hydrocarbons such as alcohols, aldehydes, carboxylic acids, etc. The fuel cell differs from the ordinary dry or wet cell storage battery in that fuel and oxidant, e.g. oxygen gas, air, etc., are made continuously available to the cell from an outside source while it is operating as opposed to having the fuel and oxidant stored within the unit. By way of further difference, fuel cell electrodes are neither consumed nor deactivated over a reasonable period of time by the reaction occurring within the cell, whereas in most conventional batteries at least one electrode is sacrificial, i.e. serves as fuel and is consumed with use. The unique value of the fuel cell lies in its ability to convert chemical energy to electrical energy continuously and with a greater efficiency than conventional means of power production.

The overall fuel cell reaction is a combination of complementary half cell reactions. A fuel cell includes at least one fuel electrode and at least one oxygen electrode, an electrolyte providing ionic conductance between such electrodes, means for passing an oxidizing gas into dual contact with electrolyte and oxygen electrode, means for passing fuel into dual contact with electrolyte and fuel electrode, and means for electron conduction between fuel electrode and oxygen electrode external to such electrolyte.

The term "oxygen electrode" has been used extensively in the fuel cell art as that electrode to which the oxodizing gas employed to effect the cathodic half cell reaction is admitted and hence is employed herein. The term "oxidizing gas," however, may include pure oxygen, oxygen mixed with other elements or compounds, mixtures of oxygen and carbon dioxide, air, etc., and in other embodiments, particularly where the production of chemical products is one facet of the fuel cell operation, may also include other oxidizing materials, e.g. the halogens such as chlorine and bromine. When air is employed as the oxidizing gas, the nitrogen component normally does not enter into the fuel cell reaction and must be purged from the cell.

Catalysts are employed in association with both anode and cathode to promote the respective half cell reactions associated therewith. Although certain conductors suitable for electrode construction also have catalytic properties, it has been more feasible to employ the more costly catalytic materials in conjunction with less expensive and more adaptable conductors.

It is a fundamental principle in the design of fuel cells that the rate of electrochemical reaction depends upon the areas within the cell that are simultaneously exposed to the electrolyte, fuel conductor and catalyst of the anodic half cell and to the electrolyte, oxidant, conductor and catalyst of the cathodic half cell. The desideratum is therefore to bring electrolyte, catalyst, electrode and reactant all into contact with each other at as great a number of reaction sites as possible within the space limitations of the cell.

Heretofore, it has been conventional to employ diffusion type electrodes to serve the dual purpose of admitting fuel and oxidant to the reaction sites and to provide means for receiving and transmitting electrical energy as a part of the electrical circuit. Such electrodes are commonly continuous structures of porous carbon, porous metal or porous containers having inside a rigid conductor surrounded by metal or carbon particles. In each of these electrode types the catalyst either forms an integral part of the electrode base, or such base is impregnated with the desired catalyst. In addition, certain nondiffusion type electrodes have been employed as the fuel electrode of cells restricted to the use of electrolyte soluble fuel, e.g. alcohols. Here the external surface of the electrode is in contact with a solution of fuel and electrolytes, and as in the diffusion type electrodes described, the catalyst is a part of or affixed to the electrode base. Systems employing electrodes of the types described have certain inherent deficiencies. Since catalyst, conductor, electrolyte and reactant, i.e. fuel or oxidant, must all be brought together to effect the desired electrochemical half cell reaction, only the catalyst position at the juncture of these other components is of any value. Or, otherwise stated, in any system wherein such catalyst sites are fixed upon the conductor, activity is inherently limited by the necessity of bringing both electrolyte and reactant into contact with such sites. Obviously, in a system employing fixed catalyst sites, catalyst regeneration would be difficult, if not impossible, while the cell is in operation.

It has now been discovered that a fuel cell utilizing a slurry of catalyst in the anolyte and/or catholyte can be operated so as to produce a pulsating direct electrical current. Such operation entails the controlled pumping of the slurry past the anode and/or cathode located within the anolyte or catholyte. The controlled movement of the slurry past the anode and/or cathode is imposed by means of a device which vibrates or reciprocates in approximately simple harmonic motion.

In accordance with the instant invention the anolyte and catholyte of the cell are separated by means which will prevent the particulate solids of the electrolyte from passing from the anolyte to the catholyte or from the catholyte to the anolyte, which does not impede the interference of ions between the anode and cathode of the cell. In the operation of the cell the distance between the anode and cathode is maintained at a minimum in order to reduce the IR drop which depends upon the distance between the electrodes. The electrodes are spaced apart from each other by the shortest distance feasible in accordance with the overall design of the cell to reduce voltage losses due to internal resistance.

In a preferred embodiment the electrodes are separated by a semipermeable cell divider which may be an ion-exchange membrane and which is preferably a homogeneous or interpolymer type membrane of low internal resistance, an electrolyte permeable pad of electrolyte resistant fibers, e.g. asbestos, etc., or other forms of porous or electrolyte permeable materials. Either the divider or the electrodes employed must serve as a barrier to catalyst transfer from slurry to the opposing electrode. Such divider is ion permeable and hence allows for some electrolyte transfer between anolyte and catholyte. However, such divider should be essentially impermeable to a flow of fuel and bubbles of unreacted oxygen. The space between electrodes should not exceed about ¼ inch and will ordinarily be less than 0.01 inch when a semipermeable membrane is employed. In another embodiment the electrodes are designed to prevent catalyst transfer between the anolyte compartment and the catholyte compartment while transfer of ions between compartments is effected through an electrolyte saturated porous material between the electrodes.

The catalyst support means employed in accordance with this invention are electrical conductors. The particles may consist of the desired catalytic metal itself, or they may be prepared by catalyst impregnation of other material such as porous carbon or graphite in accordance with methods known in the art. Such methods include soaking the porous carbon structure in aqueous solutions of a salt of the desired metal, decomposing the adsorbed material at elevated temperatures and reduction to the elemental metal under hydrogen. Electrodeposition of the desired catalyst has also proven effective. In either embodiment a portion of the catalyst-bearing particle may be coated or otherwise impregnated with "wetproofing materials" by the same methods employed in the art for wetproofing conventional catalyst-containing electrodes, e.g. by electrodeposition of fluorocarbon polymers such as polytetrafluoroethylene, polymerization in situ of high molecular weight hydrocarbon polymers such as polypropylene, etc.

In accordance with this invention the electrodes must admit of electrolyte transfer therethrough. Preferably such electrodes are fine mesh wire screen of a suitable electrolyte resistant metal. They may also be constructed of porous sheets of the same materials.

As explained in greater detail below, the screen or porous sheet performs the primary function of accepting or giving up electrons to catalyst particles. Particles on each side circulate within their zone and repeatedly contact the electrode with which they are associated. At the anode electrons are given up to the electrode while at the cathode they are gathered off the electrode. The ionic transfer between electrodes takes place across the catalyst-free portion of the electrolyte, e.g. the semipermeable membrane.

In accordance with this invention the anolyte and catholyte compartments are charged with particulate solids of a size which will be retained by a 150 mesh screen. Such solids are preferably in the range of about 104 to about 500 microns or above in diameter. Electrolyte is admitted to each compartment and in addition a combustible fuel which may be either a gas or liquid is admitted to the anolyte while an oxidizing gas is admitted to the catholyte.

The catalyst-bearing particulate solids flow past the anode and/or cathode with an instantaneous velocity varying in unison with the oscillators acting in the system. Frequency of contacts of particulate solids with the anode and cathode varies directly with the instantaneous velocity of the slurry past the fixed electrodes. Controlled slurry flow past the electrodes is accomplished by means of a simple harmonic actuator. In any fuel cell system the rate controlling steps are in bringing the electrolyte and reactant, that is, the fuel or oxidant, to the catalyst and then transferring the ions away from the catalyst. In each half cell of the fuel cell this involves both sorption of reactant and desorption of products. In the cell the process of this invention, the time-consuming steps are effected in the catalyst slurry, while the instantaneous step of giving up the electrons is conducted by contacting the particulate solids with the electrical conductor herein called anode or cathode. The time-consuming steps can take place anywhere within the slurry volume; however, contact of each slurried particle with the electrode must be made periodically so that the particle can be discharged and continue to function. It has been found that pulsating current can be made by varying the number of contacts of the particulate solids with the electron conductor per unit of time.

The catalyst-bearing particle preferably has both hydrophobic and hydrophilic components to allow for adsorption of both aqueous electrolyte and electrolyte immiscible fuels such as hydrocarbons. As aforementioned, the wetproofing of such catalyst particles may be effected by conventional techniques employed in the art for wetproofing the larger pores of gas diffusion electrodes, e.g. polymerization of a high molecular weight organic polymer such as polyethylene in situ, electrodeposition of minute particles of polymer such as polymers of tetrafluoroethylene and/or hexafluoropropylene. The wetproofing may be effected upon larger structures than the particles to be used prior to such being cut or broken up into particle size or may be applied after the catalyst-comprising particle is in particulate form. When the fuel is soluble in the electrolyte, e.g. methyl alcohol, such division of surface conditions is unnecessary.

Catalyst particles or catalyst-bearing particles may be withdrawn from the anolyte and catholyte compartments either continuously or intermittently for purposes of regeneration. This invention is not limited to the use of any specific catalyst and may be practiced utilizing any of the effective fuel cell catalysts known to the art such as metals of Groups IB and VIII of the Periodic Table, manganese, tungsten, alloys of such metals with each other and other metals and compounds which include metals such as cobalt molybdate, manganese molybdate, etc. Likewise, the catalyst employed in the anolyte may be the same or different from that employed in the catholyte in accordance with the known catalytic properties of the specific catalyst chosen to promote the half cell reaction for which it is employed.

The concentration of particulate solids in the anolyte and catholyte compartments can be varied over a broad range to obtain good cell performance. The actual concentration used will be selected to give good fluidity within the cell. This selection will then be influenced by particle size distribution, particle density, particle shape, fluidizing velocity, fluid density and viscosity, etc. While all of the above factors influence particulate, solid fluidization, the concentration of solids may vary in the range of about 2 to 20 pounds of solids per gallon of electrolyte and in most embodiments will be in the range of 5 to 15 pounds per gallon.

The rate of flow of fuel and oxidant to their respective compartments can also be varied over a wide range and will be selected in accordance with cell size and design, catalyst concentration, size and density, electrolyte composition and concentration, and composition of fuel and oxidizing gas. Where air is employed as the oxidant, the charge of air to the cell will ordinarily be at least double the amount required as reactant. Excess amounts of fuel may also be employed.

Referring now to the drawing, FIGURE 1 shows a schematic side view of one embodiment of a cell for carrying on the process of this invention, showing the interior of the cell in cross section.

FIGURE 2 shows a schematic side view of another embodiment of a cell to conduct the instant process. The figure shows the interior of the cell in cross section.

FIGURE 3 is a schematic view of the exterior of the cell shown in FIGURE 2.

Referring now to FIGURE 1, there is shown a schematic sectional side view of a cell. There is shown a cell container 1 which is made of a nonconductive material such as glass, porcelain, synthetic polymer, hard rubber, etc., said nonconductive material is rigid in order to retain the shape of the cell. Cell container 1 is fitted with flexible members 14 and 15 which can be moved inwardly and outwardly by means of elements 12 and 13 which are actuated by a device such that they both move toward the electrodes and away from the electrodes in response to a simple harmonic vibrator or the like. Cell container 1 is divided into two compartments by ion-permeable membrane 4. Ion-permeable membrane 4 comprises an ion-exchange membrane or a membrane which is porous to the electrolyte. Anode 2 and cathode 3 are devices for collecting and conducting electrical energy and are in contact with separator 4. The thickness, that is, the distances between the two surfaces of separator 4 in contact with electrodes 2 and 3 is preferably kept at a minimum. Compartments 5 and 6 are filled with an aqueous electrolyte having solid particulate catalytic material therein, such that the electrolyte and material comprises a slurry. In the actual operation of the cell the slurry need not be but in one compartment; however, both compartments preferably contain the slurry. Compartment 5 is provided with inlet means 7 for the admission of fuel into the cell. Compartment 6 is provided with inlet means 8 for the admission of oxidant to the cell. Anode 2 and cathode 3 are connected externally to the cell by electrically conductive conduits 9 and 10 through a device 11 for translating electrical energy into work or heat. Conduits 9 and 10 comprise preferably materials such as copper wires, silver wires, nickel wires, etc. The anode 2 and cathode 3 comprise material which will conduct a current such as metal screens which are resistant to the particular electrolyte used. In this regard we note that the basic mediums, nickel and silver, may be used, whereas in acid mediums, gold and platinum screens are preferable. Various membranes may be used as element 4, such that when saturated with electrolyte they essentially prevent union of unreacted fuel and oxidizing gas, and are well known in the art, and such do not comprise a part of this invention. See, for example, H. P. Gregor et al., Journal of Physical Chemistry, pages 141, 147 and 151, volume 61 (1957); U.S. Patents 2,636,851 and 2,913,511 and British Patent 794,471, etc. Other ion-permeable nonconductors, e.g. porous earthenware or ceramics, electrolyte resistant fiber mats, etc., which effect the same purpose may be substituted for the membranes described.

FIGURE 2 shows a schematic sectional view of another embodiment of this invention. There is shown a cell container 20 comprising a rigid substance which is nonreactive with the electrolyte being used and which will retain its shape for a prolonged period of time. Materials which can be used for this purpose are ceramics, glass, metals, synthetic resins and hardened rubber. The cell defined by container 20 is divided into two compartments by means of barrier separator 23. Barrier separator 23 comprises a material which will admit the conductance of ions but will prevent the flow of fuel oxidant and particulate solids from one compartment to the other. The preferred materials for use as element 23 include ion-exchange membranes and polymeric membranes which are saturated with an electrolyte. Element 23 is preferably in contact with anode 21 and cathode 22. Anode 21 and cathode 22 are electrically conductive materials whose function is to collect and distribute the electrons. Electrically conductive materials 35 and 36 provide for the conduction of electrons between anode 21 and cathode 22 external to the cell through an electrically operated device 34. Chamber 30 is fitted with inlet means 28 for the admission of fuel into the chamber. Chamber 31 is fitted with inlet means 29 for the admission of oxidant. Container 20 is fitted with reservoir areas 24 and 26 which are fitted with pistons 25 and 27 which are moved back and forth within reservoirs 24 and 26 by means of actuators 32 and 33. The pistons 25 and 27 are actuated by a device in simple harmonic motion. During the operation of the cell, the pistons 25 and 27 move inwardly simultaneously thereby causing slurry to flow into chambers 30 and 31. When pistons 25 and 27 simultaneously move backwardly, slurry flows out of chambers 30 and 31 and into reservoirs 24 and 26.

FIGURE 3 is an external view of the cell shown in cross section in FIGURE 2. FIGURE 3 specifically points out the general shape of reservoirs 24 and 26.

In the practice of this invention rather than having both the anolyte and catholyte comprise a slurry of finely divided catalyst and electrolyte, only one may contain the slurry. It is of course to be noted that the efficiency of the cell for producing a pulsating current will in the case of the cell utilizing a slurry only in one compartment be controlled by the efficiency of that compartment. It is also to be noted that the cells can be modified when utilizing the slurry only in one compartment, omitting the oscillating device from the compartment not containing the slurry.

The voltage output of a cell such as described herein can be increased by passing the pulsating current through a transformer.

What is claimed is:

1. A method of producing pulsating direct electrical current from a fuel cell comprising a container adapted to retaining a liquid divided into an anode compartment and a cathode compartment by an ion-permeable membrane, said ion-permeable membrane having an electrically conductive device juxtaposed to each of its surfaces which comprises maintaining in at least one of said anode and cathode compartments an electrolyte slurry of an aqueous electrolyte and finely divided particulate catalytic material, and moving said slurry upwardly and then downwardly cyclically in the anode or cathode compartments by means in direct contact with said slurry operating in approximate simple harmonic motion.

2. A method as in claim 1 wherein both the anode and cathode compartments are filled with an electrolyte slurry.

3. A method as in claim 1 wherein a portion of the catalyst slurry is withdrawn from each compartment, treated to reactivate the solids and returned to each compartment.

4. A method of producing pulsating direct electrical current from a fuel cell comprising a container adapted to retain a liquid which is divided into an anode compartment and a cathode compartment by an ion-permeable membrane, said ion-permeable membrane having juxtaposed to each of its surfaces an electrically conductive device which comprises maintaining in at least one of said anode and cathode compartments an electrolyte slurry comprising an aqueous electrolyte and finely divided catalytic particles, and moving said slurry so that said catalytic particles contact said conductive device cyclically by means in direct contact with said slurry operating in approximate simple harmonic motion.

5. A method of producing pulsating electrical current from a fuel cell comprising a container adapted to retain a liquid divided into an anode compartment and a cathode compartment by an ion-permeable membrane, said ion-permeable membrane having an electrically conductive device juxtaposed to each of its surfaces which comprises maintaining in each of said anode and cathode compartments an electrolyte slurry comprising an aqueous electrolyte and finely divided catalytic particles, and simultaneously moving the slurry in each of said compartments upwardly and downwardly in approximate simple harmonic motion in each of said compartments in order that said catalytic particles will cyclically contact said conductive device in each of said compartments.

6. A method as in claim 5 wherein said catalytic particles are finely divided carbon impregnated with metallic catalyst.

7. A method as in claim 5 wherein said aqueous electrolyte is 30 weight percent sulfuric acid.

8. A fuel cell apparatus which comprises:
 (a) a liquid retaining chamber;
 (b) an ion permeable membrane disposed within said liquid retaining chamber dividing said chamber into two compartments;
 (c) an electrolyte slurry containing aqueous electrolyte and finely divided particulate catalyst material disposed in at least one of the compartments formed by said ion permeable membrane;
 (d) two electrically conductive elements juxtaposed to each of the surfaces of said ion permeable membrane;
 (e) means for delivering fuel and oxidant to the cell; and
 (f) means directly contacting with the electrolyte slurry for imparting approximate simple harmonic motion to said slurry.

No references cited.

A. B. CURTIS, Primary Examiner